United States Patent
Konieczka

[11] Patent Number: 5,535,618
[45] Date of Patent: Jul. 16, 1996

[54] SEAL INTEGRITY EVALUATION METHOD

[75] Inventor: John Konieczka, Chicago, Ill.

[73] Assignee: The Quaker Oats Company, Chicago, Ill.

[21] Appl. No.: 381,369

[22] Filed: Jan. 31, 1995

[51] Int. Cl.$^6$ .............................. A61B 19/00; G01M 3/16
[52] U.S. Cl. ..................... 73/49.3; 73/40; 73/49.2 R; 73/45; 324/693
[58] Field of Search ............................... 73/49.3, 49.2 T, 73/40, 45.5, 49.2 R; 324/693, 692, 719

[56]    References Cited

U.S. PATENT DOCUMENTS

| | | | |
|---|---|---|---|
| 2,846,872 | 8/1958 | McAdams et al. | 73/49.3 |
| 3,431,773 | 3/1969 | Calhoun | 73/49.3 |
| 4,135,384 | 1/1979 | Burwell, Jr. et al. | 73/40.7 |
| 4,235,332 | 11/1980 | Andersen et al. | 206/219 |
| 4,282,744 | 8/1981 | Dick | 73/49.3 |
| 4,736,623 | 4/1988 | Brown et al. | 73/49.2 |
| 4,909,069 | 3/1990 | Albin et al. | 73/40 |
| 4,920,785 | 5/1990 | Etess | 73/40.7 |

OTHER PUBLICATIONS

"Emphasis on Networking for Added Security," Packaging News, Jan. 1994, pp. 24–25.
"The Status of Leak Detection", R. Kelsey, Food Drug Packaging, vol. 54, No. 11, Nov. 1990, pp. 8, 10–11, 18, 21.

*Primary Examiner*—Thomas P. Noland
*Assistant Examiner*—J. David Wiggins
*Attorney, Agent, or Firm*—Mart C. Matthews; Lars S. Johnson

[57]    ABSTRACT

The present invention relates to a method for testing for leaks in the bodies of sealed containers. The method comprises first placing a hole into the body of a sealed container, and then: (a) inserting a first electrode into a sealed container containing an electrolyte product composition, wherein the first electrode is inserted into the sealed container in a manner such that it is at least partially immersed in the electrolyte product composition; (b) immersing the sealed container into an electrolyte bath solution contained in a vessel, wherein the electrolyte bath solution is in direct contact with a second electrode, and wherein the sealed container is immersed into the electrolyte bath solution in a manner such that the seal of the sealed container is completely immersed in the electrolyte bath solution, the interior seal surface of the sealed container is completely submerged in the electrolyte product composition contained in the sealed container, and the first electrode is not in direct contact with the electrolyte bath solution; (c) connecting the first electrode and the second electrode to either a source of direct electric current or a conductivity measuring device; and (d) measuring the electric current flow or conductivity from one electrode to the other; wherein the sealed container is not leaking if there is no electric current flowing or electrical conductivity between the two electrodes, and the sealed container is leaking if there is electric current flowing or electrical conductivity between the two electrodes. The present invention further relates to an apparatus capable of detecting seal leaks in this manner.

21 Claims, 1 Drawing Sheet

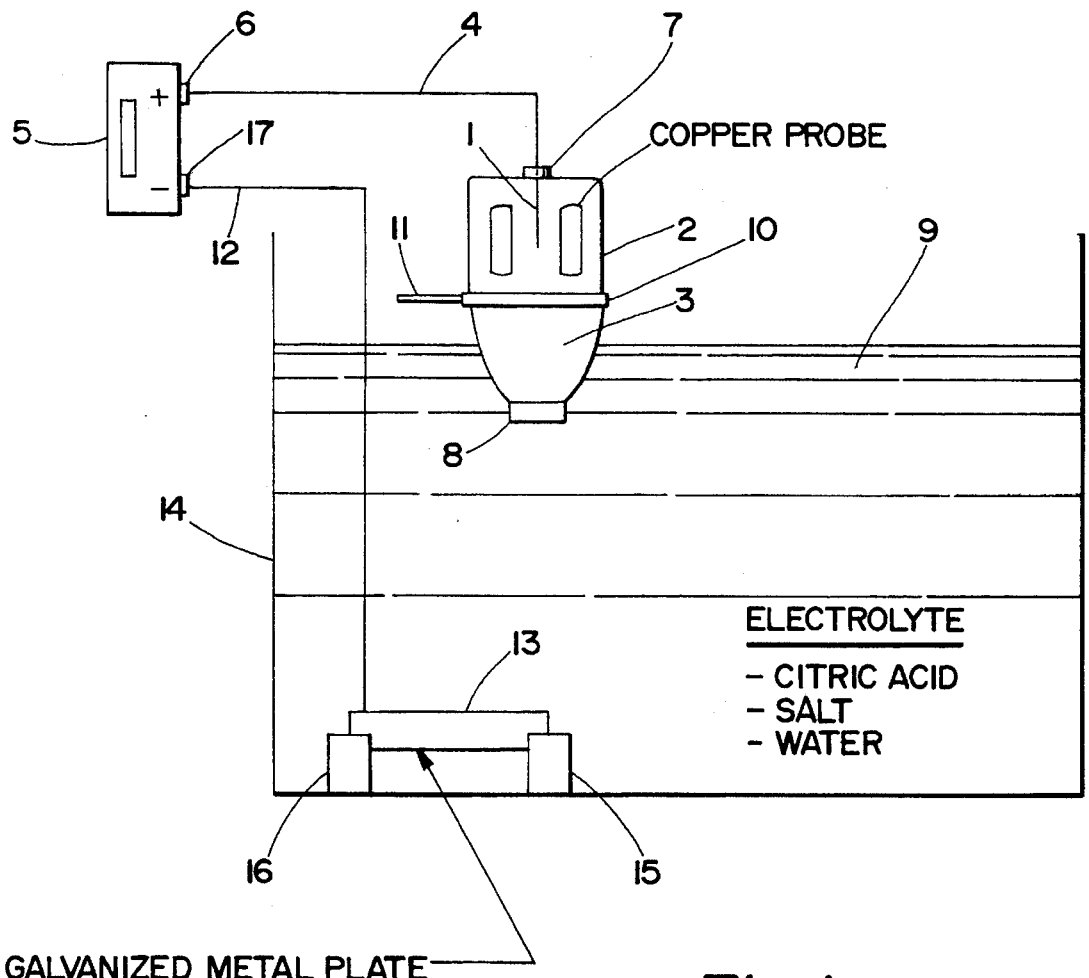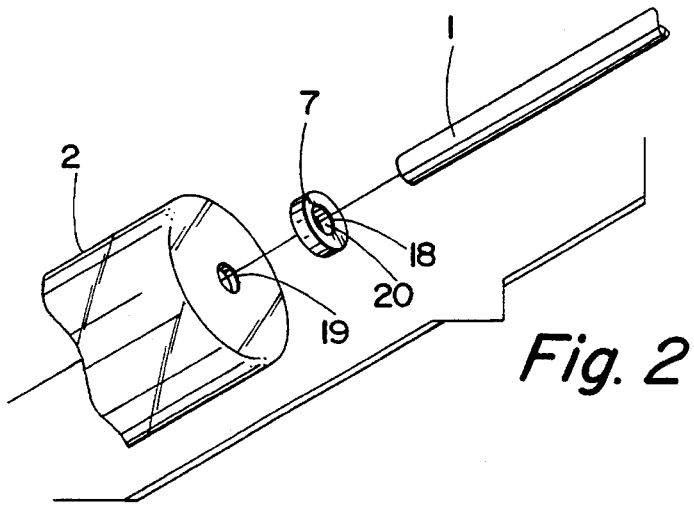

5,535,618

SEAL INTEGRITY EVALUATION METHOD

FIELD OF INVENTION

The present invention relates to a method for evaluating the seal integrity of a sealed container. The seal integrity is evaluated by measuring the electrical conductivity through the sealed container as it is at least partially immersed in an electrolyte solution. The present invention further relates to an apparatus useful for evaluating the seal integrity of a container.

BACKGROUND OF INVENTION

Sealed containers having seals that can be opened are used in numerous applications. For example, sealed containers are used for beverages, food and/or industrial products. The seals of these sealed containers allow for users of the products contained in the sealed containers to have easy access to the product contents. Especially beneficial are seals that can be resealed after opening. These resealable seals are typically in the form of lids and provide a great deal of convenience and numerous benefits. Their main function is to provide for the containers to be resealed after being initially opened. This function is particularly beneficial when the product contained in the sealed containers is a food item. The resealable seal allows the consumer to consume the desired portion of the packaged food item and save the remainder of the food item for later consumption. One problem with such sealed containers is that they may leak. This is especially true for plastic containers. The leaks can range from obvious leaks to micro-leaks. For plastic containers, the leaks are primarily due to processing conditions such as heat exposure, finish abrasions, fill temperature, head space, pull-up range, and inversion. Of course, when the sealed container leaks, it can cause contamination of the product contained in the container, which is of particular concern when the product is a food product.

It would therefore be desirable to prepare a method for testing for leaks in such sealed containers. It would further be desirable if such a method were simple, easy to carry out, and inexpensive. The present invention provides such a method and an apparatus for carrying out such a method.

BACKGROUND ART

Electrolytic cells are taught in introductory chemistry courses and textbooks. For example, *Chemical Principals*, W. Masterson and E. Slowinski, W. B. Saunders Company, Philadelphia (1977).

The art also teaches methods for testing the integrity of seals. The article "Emphasis on Networking for Added Security", Anon., Packag. News, Jan. 1994, pp. 24–25, discloses new non-destructive seal testing equipment used for inspecting the seals on vacuum packs. The equipment applies pressure to a completed vacuum pack, and using an electronic system measures minute changes and variations in pack pressure to detect seal irregularities.

The article "The Status of Leak Detection", R. Kelsey, Food Drug Packaging, vol. 54, no. 11, Nov. 1990, pp. 8, 10–11, 18, 21, discloses numerous seal leak detection methods. Included in the disclosed seal leak detection methods are pressure-decay testing methods, package deformation test methods. Also disclosed in the article is a method where a test product is immersed in a water-bath. As the test product is passed through a Bubble Sense unit, escaping air bubbles from a leaker are directed into special channels that align large and even very small bubbles. The bubbles are counted as they break a fiberoptic light beam and noted by a photosensor. In another disclosed method "being used to inspect ampules is the use of high-voltage electrical currents that 'wash' the surface of these small containers. Even the smallest pinhole, hair crack, capillary pore or insufficient glass-wall thickness is spotted by this high-frequency spark-test inspection method." Ibid. at 15.

However, nothing in the art teaches a method for testing the seal of sealed containers containing electrolyte compositions to determine whether the seal leaks. The art also fails to teach a simple, easy to carry out, and inexpensive method for testing for such seal leaks. The art still further fails to teach an apparatus for testing for leaks in the seals of sealed containers containing electrolyte compositions.

It is therefore an object of the present invention to provide such a simple, easy to carry out, and inexpensive method for testing for seal leaks in sealed containers having seals which can be opened and containing electrolyte product compositions. It is still a further object of the present invention to provide for an apparatus for testing for such seal leaks.

These objects are accomplished by the invention described herein.

SUMMARY OF THE INVENTION

The present invention relates to a method for testing for leaks in the bodies of sealed containers containing electrolyte product compositions and which have seals that can be opened, said method comprising first placing a hole into the body of a sealed container, and then:

(a) inserting a first electrode into a sealed container, wherein the sealed container has a seal that can be opened and having a hole through which the first electrode can be inserted, wherein the sealed container and the seal do not conduct electricity, wherein the sealed container contains an electrolyte product composition, and wherein the first electrode is inserted into the sealed container in a manner such that the first electrode is at least partially immersed in the electrolyte product composition and the seal is in its original sealed state;

(b) immersing the sealed container into an electrolyte bath solution contained in a vessel, wherein the electrolyte bath solution is in direct contact with a second electrode, and wherein the sealed container is immersed into the electrolyte bath solution in a manner such that the seal of the sealed container is completely immersed in the electrolyte bath solution, the interior seal surface of the sealed container is completely submerged in the electrolyte product composition contained in the sealed container, and the first electrode is not in direct contact with the electrolyte bath solution;

(c) connecting the first electrode and the second electrode to a source of direct electric current, wherein one electrode is connected to the source of direct electric current in such a manner that electrons are passed from the source of direct electric current to the electrode and the other electrode is connected to the source of direct electric current in such a manner that electrons are passed from the electrode to the source of direct electric current; and (d) measuring the conductivity from one electrode to the other;

wherein the seal and sealed container are not leaking if there is no electric current flowing from one electrode to the other, and the seal and/or sealed container are leaking if there is electric current flowing from one electrode to the other.

The present invention further relates to a method for testing for leaks in the bodies of sealed containers containing electrolyte product compositions and which have seals that can be opened, said method comprising first placing a hole into the body of a sealed container, and then:

(a) inserting a first electrode into a sealed container, wherein the sealed container has a seal that can be opened and having a hole through which the first electrode can be inserted, wherein the sealed container and the seal do not conduct electricity, wherein the sealed container contains an electrolyte product composition, and wherein the first electrode is inserted into the sealed container in a manner such that the first electrode is at least partially immersed in the electrolyte product composition and the seal is in its original sealed state;

(b) immersing the sealed container into an electrolyte bath solution contained in a vessel, wherein the electrolyte bath solution is in direct contact with a second electrode, and wherein the sealed container is immersed into the electrolyte bath solution in a manner such that the seal of the sealed container is completely immersed in the electrolyte bath solution, the interior seal surface of the sealed container is completely submerged in the electrolyte product composition contained in the sealed container, and the first electrode is not in direct contact with the electrolyte bath solution;

(c) connecting the first electrode and the second electrode to a electrical conductivity measuring device, wherein one electrode is connected to the conductivity measuring device in such a manner that electrons can pass from one electrode to the other electrode through the seal or the sealed container when the seal or sealed container leaks; and (d) measuring the electrical conductivity from one electrode to the other;

wherein the seal and seal container are not leaking if there is no measured flow of electrons from one electrode to the other, and the seal and/or the sealed container is leaking if there is a flow of electrons from one electrode to the other.

The present invention further relates to an apparatus capable of detecting seal leaks in sealed containers having seals which can be opened and containing electrolyte product compositions, said apparatus comprising a means for carrying out either of the above-describe methods.

BRIEF DESCRIPTION OF THE DRAWING

FIG. 1 is a schematic drawing showing an industrial embodiment of the method and apparatus of the present invention.

FIG. 2 is an exploded perspective view of the articles used to position and hold the first electrode partially immersed in the electrolyte product contained in the sealed container.

DETAILED DESCRIPTION OF THE DRAWING

In FIG. 1, a fragmentary view of a vessel 14 is shown to allow the viewer to view its interior from the side. Referring to FIG. 1, a first electrode 1 is inserted into a sealed container 2. In FIG. 1 the sealed container 2 is in the form of a beverage bottle and the first electrode 1 is in the form of a copper probe. The sealed container 2 contains an electrolyte product composition 3, which in FIG. 1 is in the form of an electrolyte beverage. The first electrode 1 is inserted into the sealed container 2 through a hole 19 (seen best in FIG. 2) in the sealed container 2. The first electrode 1 is inserted in the sealed container 2 in such a manner that the first electrode 1 is partially immersed in the electrolyte product composition 3 contained in the sealed container 2. The first electrode 1 is fixed spatially in its partially immersed position by a first electrode mounting device 7 attached to the sealed container 2. The first electrode mounting device 7 has a passage 18 (seen best in FIG. 2) through its center. The first electrode 1 is connected to a first wire 4 capable of conducting electric current, which in turn is connected to a source of direct electric current 5. In FIG. 1 the source of direct electric current 5 is in the form of a battery. The first wire 4 is connected to the positive terminal 6 of the source of direct electric current 5. The sealed container 2 is held in a fixed spatial position by a means for positioning the sealed container 2 in a manner such that it is partially immersed in an electrolyte bath solution 9, with the sealed container's 2 seal 8 being immersed in the electrolyte bath solution 9 and the first electrode 1 not being immersed or in direct contact with the electrolyte bath solution 9. The means shown in FIG. 1 for holding the sealed container 2 in such a fixed spatial position is a sealed container mounting device 10 which is releasably attached at one end to the sealed container 2 and attached at the other end to an arm 11. The arm 11 is fixedly mounted to a surface (not seen). The electrolyte bath solution 9 is held in a vessel 14. The vessel 14 is shown in a fragmentary view. A second wire 12 capable of conducting electrical current is connected at one end to the negative terminal 17 of the source of direct electric current 5, and at the other end to a second electrode 13 which is submerged in the electrolyte bath solution 9. In FIG. 1 the second electrode 13 is in the form of a galvanized metal plate. The second electrode 13 is attached on one side to a support member 15 and on the other side to a support member 16. Each of the support members 15 and 16 are attached to the vessel 14.

Referring to FIG. 2, the first electrode mounting device 7 is in the form of a grommet. The first electrode mounting device 7 is attached to the sealed container 2 in such a manner that the passage 18 through the first electrode mounting device 7 is axial with a hole 19 in the sealed container 2. The first electrode 1 is inserted through the passage 18 in the center of the first electrode mounting device 7 and through the hole 19 in the sealed container 2. The cylindrical inner wall 20 of the passage 18 through the first electrode mounting device 7 is flexible, yet is sufficiently stiff to hold the first electrode 1 in a selected position through friction. The first electrode mounting device 7 forms a leak-proof seal with the sealed container 2 and the first electrode 1 forms a leak-proof seal with the cylindrical inner wall 20 of the passage 18 through first electrode mounting device 7.

DETAILED DESCRIPTION OF THE INVENTION

The present invention comprises a method for testing for seal 8 leaks in sealed containers 2 having seals 8 which can be opened and containing electrolyte product compositions 3. The test method of the present invention involves measuring the electrical conductivity of a system incorporating the sealed container 2. The method of the present invention is a destructive method wherein the particular sealed container 2 is destroyed and cannot be further used in commerce. This method is useful in spot sampling sealed containers 2 being prepared for commercial sale to determine the degree of seal 8 leakage encountered for the particular lot of sealed containers 2 being prepared. This information can be used to identify any potential production problems. This method is also useful in generally evaluating the reliability of sealed containers 2 in different applications and uses that are offered by different container suppliers.

In the method of the present invention a first electrode 1 is inserted into a sealed container 2 containing an electrolyte product composition 3. The sealed container 2 has a seal 8 which can be opened. The seal 8 and sealed container 2 do not conduct electricity. This non-conducting property can be accomplished by making the seal 8 and the sealed container 2 out of a material or materials that do not conduct electricity or the seal 8 and sealed container 2 must be electrically insulated.

Examples of seals useful in the present invention include, but are not limited to, plastic caps, plastic lids, foil induction seals, pull tab seals, crown caps for bottles, tear cap seals, foil conduction seals, laminated flexible seals, and resealable seals. Preferably the seal 8 is resealable and can be closed in such a manner that when it is closed, it provides a leak seal to prevent leakage of the electrolyte product composition contents of the sealed container 2. Examples of such resealable seals include, but are not limited to, screw-on metal and plastic lids and caps, snap-open and push-pull closure devices, spray pump nozzles capable of being closed in locked position, with screw-on metal and plastic lids and caps being preferred.

Any type of sealed container 2 may be used in the method of the present invention, provided that the sealed container 2 meets the above-described non-conductivity or insulation requirements. Examples of useful sealed containers 2 include, but are not limited to, glass and plastic bottles, flexible packaging, foil packages, and cans, with glass and plastic bottles being preferred in the present invention.

The first electrode 1 can be made of any material capable of conducting an electrical current. Examples of useful materials include, but are not limited to, copper, silver, gold, aluminum, iron and steel, with copper, aluminum and steel being preferred, and copper being more preferred. In inserting the first electrode 1 into the sealed container 2, a hole 19 is made in the sealed container 2 and the first electrode 1 is inserted through the hole 19. The hole 19 can be made anywhere on the sealed container 2, provided the hole 19 does not alter the seal 8 from its original sealed state. The hole 19 can be position in a manner wherein it is not even partially immersed in the electrolyte bath solution 9 when the sealed container 2 is partially immersed in the electrolyte bath solution 9. Alternatively, the hole 19 can be completely immersed in the electrolyte bath solution 9 if a first electrode mounting device 7 is attached to the hole 19 in a manner to form a leakproof seal between the hole 19 and the first electrode mounting device 7 and between the hole 19 and the first electrode 1, and provided the first electrode 1 is not in direct electrical contact with the electrolyte bath solution 9.

The first electrode 1 is inserted into the sealed container 2 through the hole 19 in the sealed container 2 in such a manner that it is at least partially immersed in the electrolyte product composition 3 contained in the sealed container 2. The first electrode 1 is held in this partially immersed position by a first electrode mounting device 7. The first electrode mounting device 7 acts to hold the first electrode 1 in a fixed spatial position in relation to the sealed container 2. As a non-limiting example of the first electrode mounting device 7 and its operation, the first electrode 1 can be held in place by a first fixed clamp, which is the first electrode mounting device 7, and the sealed container 2 can be held in place by a second fixed clamp, which is the sealed container mounting device 10. Preferably the first electrode mounting device 7 is attached directly to the sealed container 2 and has a passage 18 through its center. This preferred first electrode mounting device 7 is attached to the sealed container 2 in such a manner that the passage 18 through the first electrode mounting device 7 is positioned in relation to the hole 19 in the sealed container 2 to allow for the first electrode 1 to be inserted through the passage 18 in the first electrode mounting device 7 and into the interior of the sealed container 2, with the first electrode 1 being at least partially immersed in the electrolyte product composition contained in the sealed container 2.

Preferably the passage 18 through the preferred first electrode mounting device 7 is aligned co-axially with the hole 19 in the sealed container 2. The walls of this preferred first electrode mounting device 7 are flexible enough to deform to allow the first electrode 1 to be passed through the passage 18 in the first electrode mounting device 7, while still maintaining contact between the walls and the first electrode 1 at at least two points, yet are sufficiently stiff to hold the first electrode 1 in a fixed spatial position in relation to the sealed container 2. The first electrode mounting device 7 also is preferably attached to the sealed container 2 in such a manner to form a leak-proof seal between the first electrode mounting device 7 and the sealed container 2. Even more preferred is a first electrode mounting device 7 that is also forms a leak-proof seal between it and the first electrode 1 when the first electrode 1 is inserted through the passage 18 in the first electrode mounting device 7. Examples of first electrode mounting devices 7 useful in the present invention include, but are not limited to, clamps or function-fit gaskets. Examples of the preferred first electrode mounting device 7 referred to herein include, but are not limited to, flexible rubber grommets, rubber washers, with rubber grommets being preferred.

The first electrode 1 can be of any shape capable of being inserted into the sealed container 2 being tested in the manner described herein. Preferably the first electrode 1 is of a long, thin cylindrical shape. Such a shape requires a minimum passage 18 opening in the first electrode mounting device 7 and a minimum opening in the sealed container 2 through which the first electrode 1 is inserted. The cylindrical nature of the shape also allows for a better fit, preferably a leak-proof seal, when the passage 18 of the first electrode mounting device 7 is in the shape of a cylindrical bore.

In the method of the present invention, leaks in the seal 8 or sealed container 2 are detected by the flow of electrons between the first electrode 1 and a second electrode 13. The flow of electrons between the electrodes can be generated by a source of direct electric current 5, which is connected to the electrodes, or by making the electrodes out of two dissimilar metals, in which case the electrons will flow from one electrode to the other due to the electrochemical potential between the two dissimilar metals. The later system is referred to as a galvanic cell.

The first electrode 1 is connected to a source of direct electric current 5 in such a manner that electrons may be passed either from the source of direct current to the first electrode 1 or from the first electrode 1 to the source of direct electric current 5. When the electrons are passed from the source of direct electric current 5 to the first electrode 1, the first electrode 1 is acting as a cathode. When the electrons are passed from the first electrode 1 to the source of direct electric current 5, the first electrode 1 is acting as an anode. The first electrode 1 may be connected to the source of direct electric current 5 in any manner known to those skilled in the art. Preferably the first electrode 1 is connected to the source of direct electric current 5 by a first wire 4 capable of conducting electric current. The first electrode 1 could also be connected directly to the source of direct electric current 5 in such a manner that electrons pass either from the source of direct electric current 5 to the first electrode 1 or from the first electrode 1 to the source of direct electric current 5 without the use of a first wire 4 to accommodate the flow of electrons.

It is believed that any source of direct electric current 5 known to those skilled in the art may be used in the present invention. A non-limiting example of a source of direct electric current is a battery having a positive and negative terminal. Preferred sources of direct electric current 5 include, but are not limited to, batteries. The source of direct electric current is preferably a low voltage, low ampere current source. This is desirable for both cost savings and safety considerations. Preferably the source of direct electric current 5 is rated at a voltage in the range of from about 1 volt to about 5 volts, more preferably from about 1 volt to about 1.2 volts, still more preferably about 1.2 volts, and has a current rating in the range of from about 100 milliamps to about 200 milliamps, more preferably about 100 milliamps.

The method of leak detection that utilizes a galvanic cell is essentially the same as the method using a source of direct electric current 5 as depicted in FIG. 1. The difference between the leak detection method using a galvanic cell versus the method using a source of direct electric current is that in the method using a galvanic cell the first electrode 1 and the second electrode 13 must be made from dissimilar metals and a conductivity measurement device is used instead of a source of direct electric current 5. In the galvanic cell leak detection method the conductivity measurement device is connected to the first electrode 1 and the second electrode 13 in the same manner as the source of direct electric current 5 is connected to the first electrode 1 and the second electrode 13. The conductivity measurement device not only measures the conductivity of the galvanic cell, but also completes the circuit of the galvanic cell, allowing the electrons to flow from one electrode to the other.

Since the test method utilizes electrical conductivity to detect seal 8 leaks, the product composition contained in the sealed container 2 must be an electrolyte. It is believed that any electrolyte product composition 3 can be utilized in the present invention. Examples of electrolyte product compositions 3 that can be contained in the sealed container 2 include, but are not limited to, industrial products and compositions suitable for human consumption such as foods and beverages, with beverages being preferred. Examples of electrolyte food and beverage compositions useful in the present invention include, but are not limited to, isotonic beverages, fruit juices, carbonated beverages and teas, with isotonic beverages being preferred. The more preferred isotonic beverage preferably comprising from 0% to about 20%, preferably from about 4% to about 10%, more preferably from about 5% to about 8% by weight of a carbohydrate source, from about 0.01% to about 5%, preferably from about 0.01% to about 2%, more preferably from about 0.2% to about 1% by weight of a salt, and a balance of water. The carbohydrate source can be any carbohydrate suitable for human consumption known to those skilled in the art, with sucrose, glucose, fructose, maltodextrins, and mixtures thereof being preferred. The salt may be any salt suitable for human consumption known to those skilled in the art, with sodium chloride, potassium chloride, sodium citrate, and mixtures thereof being preferred, and sodium chloride being more preferred.

The sealed container 2 having the first electrode 1 inserted into it is at least partially immersed into an electrolyte bath solution 9 in a manner such that the seal 8 of the sealed container 2 is completely immersed in the electrolyte bath solution 9, the interior seal 8 surface of the sealed container 2 is completely submerged in the electrolyte product composition 3 contained in the sealed container 2, and the inserted first electrode 1 is not in direct contact with the electrolyte bath solution 9. The electrolyte bath solution 9 is contained in a vessel 14.

The sealed container 2 can be either partially or totally immersed in the electrolyte bath solution 9. In either situation, the seal 8 must be immersed in the electrolyte bath solution 9 in order to detect any seal 8 leaks. Preferably the sealed container 2 is totally immersed in the electrolyte bath solution 9. When the sealed container 2 is totally immersed in the electrolyte bath solution 9, the method of the present invention can detect leaks anywhere on the sealed container 2. However, care must be taken when the sealed container 2 is immersed in the electrolyte bath solution 9 to insure that the first electrode 1 is not in direct electrical contact with the electrolyte bath solution 9 and that there is a leak proof seal between the seal mounting device 7 and the sealed container 2 and between the sealed mounting device 7 and the first electrode 1. The first electrode 1 is typically kept out of direct electric contact with the electrolyte bath solution 9 by electrically insulating the first electrode 1 from the electrolyte bath solution 9. This can be accomplished by any means known to those skilled in the art. One example of a method for accomplishing this is to completely immerse the first electrode 1 into the electrolyte product composition 3 and connect the first electrode 1 with either the conductivity measuring device or with the source of direct electric current 5 via an insulated wire 4, wherein the insulated wire 4 passes through the passage 18 of the first electrode mounting device 7, and wherein the first electrode mounting device 7 makes a leak-proof seal between it and the insulated wire 4 and between it and the sealed container. Another example is to partially pass the first electrode 1 through the passage of the first electrode mounting device 7 in a manner such that the first electrode 1 is extending out of the mounting device 7 into the electrolyte bath solution 9. In such a configuration, the first electrode 1 is wrapped with an electrically insulating material at all points where contact between the first electrode 1 and the electrolyte bath solution 9 is possible.

The sealed container 2 it held in position by a sealed container mounting device 10. The sealed container mounting device 10 is attached at one end 16 the sealed container 2 and is attached at the other end to an arm 11. The arm 11 is fixedly mounted to a surface. The sealed container mounting device 10 acts to hold the sealed container 2 in a fixed spatial position in relation to the vessel 14. Examples of sealed container mounting devices 10 useful in the present invention include, but are not limited to, a clamp or friction fit gasket, with a clamp being preferred. Preferably, the sealed container mounting device 10 can also act to temporarily deform the sealed container 2 while the sealed container 2 is immersed in the electrolyte bath solution 9. This is useful to detect leaks that might appear in the sealed container 2 or in the seal 8 when the sealed container 2 is deformed in a manner as it would under market distribution conditions such as conveying or transporting the sealed container 2.

Since the test method utilizes conductivity to detect seal 8 leaks, the bath solution contained in the vessel 14 must be an electrolyte. Almost any electrolyte bath solution 9 containing at least one electrolyte can be utilized in the present invention. Of course, destructive, i.e., corrosive, toxic or hazardous electrolyte bath solutions 9 would preferably not be used in the present invention. Examples of electrolytes that can be used to prepare the electrolyte bath solution 9 of the present invention include, but are not limited to, citric acid, sodium chloride, potassium chloride, aluminum chloride, and mixtures thereof, with citric acid, sodium chloride, potassium chloride, and mixtures thereof being preferred. More preferred are aqueous solutions comprising water and the above electrolytes. Still more preferred is an electrolyte bath solution 9 comprising from about 0.01% to about 5%, preferably from about 0.01% to about 4%, more preferably from about 0.1% to about 3% by weight of citric acid, from about 0.1% to about 2%, preferably from about 0.2% to about 1%, more preferably from about 0.3% to about 0.5% by weight of sodium chloride, and a balance of water.

A second electrode 13 is at least partially, and preferably completely immersed in the electrolyte bath solution 9. As with the first electrode 1, and as already described herein, the second electrode 13 is connected to either a source of direct electric current 5 or to a conductivity measurement device in such a manner that electrons may be passed either from one electrode to the other electrode. When a source of direct electric current 5 is used, and the electrons are passed from the source of direct electric current 5 to the second electrode 13, the second electrode 13 is acting as a cathode. When the electrons are passed from the second electrode 13 to the source of direct electric current 5, the second electrode 13 is acting as an anode. When the second electrode 13 acts as a cathode, the first electrode 1 acts as an anode, and vice-versa.

The second electrode 13 may be connected to the source of direct electric current 5 in any manner known to those skilled in the art. Preferably the second electrode 13 is connected to the source of direct electric current 5 by a second wire 12 capable of conducting current. The second electrode 13 could also be connected directly to the source of direct electric current 5 in such a manner that electrons pass either from the source of direct electric current 5 to the second electrode 13 or from the second electrode 13 to the source of direct electric current 5 without the use of a second wire 12 to accommodate the flow of electrons.

When the method of leak detection utilizes a galvanic cell, the second electrode 13 is connected to the conductivity measurement device in the same manner as it is connected to the source of direct electric current 5 when the leak detection method utilizing a source of direct electric current 5 is practiced.

The second electrode 13 may be in any shape and made of any material capable of conducting electricity. Examples of useful materials include, but are not limited to, galvanized metal such as galvanized steel and copper, with galvanized steel being preferred. A more preferred second electrode 13 is a galvanized metal plate. As already discussed herein, when the leak detection method utilizes a galvanic cell, the first electrode 1 and the second electrode 13 must be made from dissimilar metals.

The second electrode 13 is preferably fixedly mounted to the vessel 14 in a manner sufficient to provide for the at least partial, and preferably complete immersion of the second electrode 13 in the electrolyte bath solution 9 contained in the vessel 14. The second electrode 13 may be mounted to the vessel 14 by any means known to those skilled in the art. Examples of useful mounting means include, but are not limited to, bolting the second electrode 13 to a plurality of mounting brackets such as 15 and 16 that are welded or bolted to the vessel 14 surface, wherein each of the mounting brackets are welded to the vessel surface or are capable of receiving a bolt and allowing for the tightening of the bolt; and welding the second electrode 13 to a plurality of mounting brackets, wherein each of the mounting brackets are welded or bolted to the vessel 14 surface. When the mounting brackets are bolted to the vessel 14 surface, and if the bolts pass through the vessel 14 wall, leak-proof seals must be used to prevent leakage at the point where the bolts pass through the vessel 14 wall.

Once all the elements described herein are in place, the apparatus is capable of making an electric circuit, and electricity will flow from one electrode to the other if the seal is leaking. The direction of the flow of electricity will depend upon which electrode is the cathode and which electrode is the anode. The electric current flow may be measured by any means and in any manner known to those skilled in the art for measuring electric current flow. Examples of useful means of measuring the electric current flow include, but are not limited to, ohm meters, conductivity meters, volt meters, and amp meters, with ohm meters and conductivity meters being preferred. If no electric current flow is measured, then the seal 8 is not leaking. If an electric current flow is measured, then the seal 8 is leaking. The size of the leak may be determined by the magnitude of current flow, with a greater level of current flow indicating a larger leak.

The present invention further relates to an apparatus comprising a means for carrying out the method described herein.

What is claimed is:

1. A method for testing for seal leaks in the bodies of sealed containers containing electrolyte product compositions and which have seals that can be opened, said method comprising:

(a) placing a hole into the body of a sealed container;

(b) inserting a first electrode into a sealed container, wherein the sealed container has a seal that can be opened and having a hole through which the first electrode can be inserted, wherein the sealed container and the seal do not conduct electricity, wherein the sealed container contains an electrolyte product composition, and wherein the first electrode is inserted into the sealed container in a manner such that the first electrode is at least partially immersed in the electrolyte product composition and the seal is in its original sealed state;

(c) immersing the sealed container into an electrolyte bath solution contained in a vessel, wherein the electrolyte bath solution is in direct contact with a second electrode, and wherein the sealed container is immersed into the electrolyte bath solution in a manner such that the seal of the sealed container is completely immersed in the electrolyte bath solution, the interior seal surface of the sealed container is completely submerged in the electrolyte product composition contained in the sealed container, and the first electrode is not in direct contact with the electrolyte bath solution;

(d) connecting the first electrode and the second electrode to a source of direct electric current, wherein one electrode is connected to the source of direct electric current in such a manner that electrons are passed from the source of direct electric current to the electrode and the other electrode is connected to the source of direct electric current in such a manner that electrons are passed from the electrode to the source of direct electric current; and (e) measuring the conductivity electrical from one electrode to the other;

wherein the seal and sealed container are not leaking if there is no electric current flowing from one electrode to the other, and the seal and/or sealed container are leaking if there is electric current flowing from one electrode to the other.

2. A method according to claim 1 wherein said sealed container is made of plastic and wherein said seal is a resealable seal made of plastic.

3. A method according to claim 2 wherein said seal is a screw on cap.

4. A method according to claim 3 wherein said electrolyte product composition comprises an isotonic beverage comprising water, a carbohydrate source, and a salt.

5. A method according to claim 4 wherein said carbohydrate source is selected from the group consisting of sucrose, fructose, glucose, maltodextrins, and mixtures thereof, and wherein said salt is selected from the group consisting of sodium chloride, potassium chloride, sodium citrate, and mixtures thereof.

6. A method according to claim 5 wherein said electrolyte bath comprises water, and an electrolyte.

7. A method according to claim 6 wherein said electrolyte is selected from the group consisting of citric acid, sodium chloride, potassium chloride, aluminum chloride, and mixtures thereof.

8. A method according to claim 7 wherein the first electrode is made of copper and wherein the second electrode is a galvanized metal plate.

9. A method according to claim 8 wherein the first electrode is an anode and wherein the second electrode is a cathode.

10. A method according to claim 9 wherein the source of direct electric current is a battery having a voltage rating of about 1.2 volts and a current rating of about 100 milliamps.

11. An apparatus capable of detecting seal leaks in the bodies of sealed containers having seals which can be opened and containing electrolyte product compositions, said apparatus comprising a means for:

(a) placing a hole into the body of a sealed container;

(b) inserting a first electrode into a sealed container, wherein the sealed container has a seal that can be opened and having a hole through which the first electrode can be inserted, wherein the sealed container and the seal do not conduct electricity, wherein the sealed container contains an electrolyte product composition, and wherein the first electrode is inserted into the sealed container in a manner such that the first electrode is at least partially immersed in the electrolyte product composition and the seal is in its original sealed state;

(c) immersing the sealed container into an electrolyte bath solution contained in a vessel, wherein the electrolyte bath solution is in direct contact with a second electrode, and wherein the sealed container is immersed into the electrolyte bath solution in a manner such that the seal of the sealed container is completely immersed in the electrolyte bath solution, the interior seal surface of the sealed container is completely submerged in the electrolyte product composition contained in the sealed container, and the first electrode is not in direct contact with the electrolyte bath solution;

(d) connecting the first electrode and the second electrode to a source of direct electric current, wherein one electrode is connected to the source of direct electric current in such a manner that electrons are passed from the source of direct electric current to the electrode and the other electrode is connected to the source of direct electric current in such a manner that electrons are passed from the electrode to the source of direct electric current; and (e) measuring the electrical conductivity from one electrode to the other; wherein the seal and sealed container are not leaking if there is no electric current flowing from one electrode to the other, and the seal and/or sealed container are leaking if there is electric current flowing from one electrode to the other.

12. A method for testing for seal leaks in the bodies of sealed containers containing electrolyte product compositions and which have seals that can be opened, said method comprising:

(a) placing a hole into the body of a sealed container;

(b) inserting a first electrode into a sealed container, wherein the sealed container has a seal that can be opened and having a hole through which the first electrode can be inserted, wherein the sealed container and the seal do not conduct electricity, wherein the sealed container contains an electrolyte product composition, and wherein the first electrode is inserted into the sealed container in a manner such that the first electrode is at least partially immersed in the electrolyte product composition and the seal is in its original sealed state;

(c) immersing the sealed container into an electrolyte bath solution contained in a vessel, wherein the electrolyte bath solution is in direct contact with a second electrode, and wherein the sealed container is immersed into the electrolyte bath solution in a manner such that the seal of the sealed container is completely immersed in the electrolyte bath solution, the interior seal surface of the sealed container is completely submerged in the electrolyte product composition contained in the sealed container, and the first electrode is not in direct contact with the electrolyte bath solution;

(d) connecting the first electrode and the second electrode to a electrical conductivity measuring device, wherein one electrode is connected to the conductivity measuring device in such a manner that electrons can pass from one electrode to the other electrode through the seal or the sealed container when the seal or sealed container leaks; and (e) measuring the electrical conductivity from one electrode to the other;

wherein the seal and seal container are not leaking if there is no measured flow of electrons from one electrode to the other, and the seal and/or the sealed container is leaking if there is a flow of electrons from one electrode to the other.

13. A method according to claim 12 wherein said sealed container is made of plastic and wherein said seal is a resealable seal made of plastic.

14. A method according to claim 13 wherein said seal is a screw on cap.

15. A method according to claim 14 wherein said electrolyte product composition comprises an isotonic beverage comprising water, a carbohydrate source, and a salt.

16. A method according to claim 15 wherein said carbohydrate source is selected from the group consisting of sucrose, fructose, glucose, maltodextrins, and mixtures thereof, and wherein said salt is selected from the group consisting of sodium chloride, potassium chloride, sodium citrate, and mixtures thereof.

17. A method according to claim 16 wherein said electrolyte bath comprises water and an electrolyte.

18. A method according to claim 17 wherein said electrolyte is selected from the group consisting of citric acid, sodium chloride, potassium chloride, aluminum chloride, and mixtures thereof.

19. A method according to claim 18 wherein the first electrode is made of copper and wherein the second electrode is a galvanized metal plate.

20. A method according to claim 19 wherein the first electrode is an anode and wherein the second electrode is a cathode.

21. An apparatus capable of detecting seal leaks in the bodies of sealed containers having seals which can be opened and containing electrolyte product compositions, said apparatus comprising a means for:

(a) placing a hole into the body of a sealed container;

(b) inserting a first electrode into a sealed container, wherein the sealed container has a seal that can be opened and having a hole through which the first electrode can be inserted, wherein the sealed container and the seal do not conduct electricity, wherein the sealed container contains an electrolyte product composition, and wherein the first electrode is inserted into the sealed container in a manner such that the first electrode is at least partially immersed in the electrolyte product composition and the seal is in its original sealed state;

(c) immersing the sealed container into an electrolyte bath solution contained in a vessel, wherein the electrolyte bath solution is in direct contact with a second electrode, and wherein the sealed container is immersed into the electrolyte bath solution in a manner such that the seal of the sealed container is completely immersed in the electrolyte bath solution, the interior seal surface of the sealed container is completely submerged in the electrolyte product composition contained in the sealed container, and the first electrode is not in direct contact with the electrolyte bath solution;

(d) connecting the first electrode and the second electrode to a electrical conductivity measuring device, wherein one electrode is connected to the conductivity measuring device in such a manner that electrons can pass from one electrode to the other electrode through the seal or the sealed container when the seal or sealed container leaks; and (e) measuring the conductivity from one electrode to the other;

wherein the seal and seal container are not leaking if there is no measured flow of electrons from one electrode to the other, and the seal and/or the sealed container is leaking if there is a flow of electrons from one electrode to the other.

* * * * *